United States Patent [19]
Sirota et al.

[11] 3,888,811
[45] June 10, 1975

[54] WATER-MOISTENABLE HOT-MELT APPLICABLE ADHESIVE COMPOSITION

[75] Inventors: Jilius Sirota, Plainfield; Robert S. Forsyth, Basking Ridge; David Fergesen, Neshanic Station, all of N.J.

[73] Assignee: National Starch and Chemical Corporation, Bridgewater, N.J.

[22] Filed: Sept. 26, 1973

[21] Appl. No.: 400,926

[52] U.S. Cl........ 260/23 R; 260/23 EP; 260/28.5 A; 260/31.6; 260/895
[51] Int. Cl........................ C08f 19/14; C08f 21/04
[58] Field of Search............. 260/28.5 A, 895, 31.6, 260/23 EP, 23 R

[56] References Cited
UNITED STATES PATENTS

| | | | |
|---|---|---|---|
| 3,156,661 | 11/1964 | Sanford | 260/28.5 A |
| 3,245,930 | 4/1966 | McDonell | 260/28.5 A |
| 3,345,320 | 10/1967 | Uffner | 260/31.6 |
| 3,428,591 | 2/1969 | Lewis | 260/28.5 A |
| 3,462,342 | 8/1969 | Cooper | 260/895 |
| 3,590,101 | 6/1971 | McTaggert | 260/28.5 A |

*Primary Examiner*—Donald E. Czaja
*Assistant Examiner*—William E. Parker

[57] ABSTRACT

A water-moistenable hot-melt applicable adhesive composition is characterized by the absence of blocking at 75 percent relative humidity under 0.4 p.s.i.g. load at 22°C for 24 hours. The composition consists essentially of a blend of at least one water sensitive vinyl pyrrolidone/vinyl acetate copolymer, at least one water-soluble solid polyethylene glycol based wax having an average molecular weight of at least 4,000, and at least one water-insoluble solid wax. The water-soluble wax is generally selected from the group consisting of polyethylene glycol, the reaction porduct of polyethylene glycol and a diepoxide, and mixtures thereof. Preferably the water-soluble wax is a mixture of polyethylene glycol having an average molecular weight of at least 4,000 and a reaction product of polyethylene glycol and a diepoxide, the reaction product having an average molecular weight of at least 20,000.

11 Claims, No Drawings 3,888,811

WATER-MOISTENABLE HOT-MELT APPLICABLE ADHESIVE COMPOSITION

BACKGROUND OF THE INVENTION

A water-moistenable hot-melt applicable adhesive composition is a bonding agent which may be applied to one surface utilizing a hot-melt technique and another surface using a water-moistening technique, so that the two surfaces are bonded together by means of the composition. By way of example, such a composition may be applied by the hot melt technique as gumming for labels, sealing tapes and envelope flaps at a point of manufacture where the intricate equipment required for hot-melt application is available, the labels, sealing tape and envelope flaps ultimately being applied by the consumer to other surfaces using the much simpler water-moistening technique, e.g., simply by licking or otherwise moistening the adhesive coating prior to application to the other surface. The hot-melt application technique is utilized where the required equipment is available because it is a rapid and economical technique; the water-moistening technique is utilized precisely because it doesn't require such elaborate equipment.

To be applicable by a hot-melt technique, an adhesive composition must achieve a solid state and resultant cohesive strength by cooling, as opposed to other types of adhesives which achieve the solid state through evaporation or removal of solvents, or by polymerization. At room temperature, a hot-melt applicable adhesive is a thermoplastic, non-volatile solid material. When the hot-melt adhesive is heated, it liquifies; after removal of heat, it solidifies on cooling. When a liquified hot-melt adhesive is brought into close contact with the surface to which it is to be applied, a molecular layer of the surface of the substrate immediately reaches a temperature approximately that of the molten adhesive and a high degree of wetting (almost coalescence) of the molten adhesive with the substrate surface occurs. Immediately after contact, the molten adhesive loses heat to the substrate surface and a temperature equilibrium is obtained. Since the adhesive is in contact with a mass much larger than itself, the temperature of the entire system will drop to a point where the adhesive sets to a solid having adequate cohesive strength to bind it to the substrate surface. Hot melt adhesives are usually used for reasons such as process speed, streamlining of process equipment by elimination of driers and other auxiliary equipment or the like. In particular, hot-melt applicable adhesives are preferred because of the speed with which they produce bonds and because they do not require flashoff of volatiles prior to making the bonds. Hot-melt adhesives eliminate the expense of solvents; however, the greater cost reductions result from the time saved in application of the adhesive.

To be water-moistenable, an adhesive composition must be activatable by moistening with water; i.e., a watertackifiable bonding agent. Materials used in the compounding of water-moistenable adhesives are of necessity water-soluble or water-dispersible and the adhesive composition is usually applied to the substrate as an aqueous system having a dried solids content of about 45–70 percent. When the bonding agent is moistened with water, the adhesive film obtains almost instantaneously a gummy or tacky wet state which permits it to bond with a degree of permanence to other surfaces. It should be noted that generally the water-moistenable adhesives are first applied in aqueous form as a wet film on a backing or substrate such as paper by means of applicator rolls, and then thoroughly dried by passing the coated substrate through a drying chamber; eventually the coated substrate is remoistened with water at the time the coated substrate is to be bonded to another surface.

It should be noted that both hot-melt and water-moistenable adhesives may also be utilized to immediately bond two substrates together, for example, by applying the molten hot-melt or aqueous water-moistenable adhesive to both substrates before the molten adhesive has had an opportunity to cool, or the water an opportunity to evaporate.

In attempting to provide a single adhesive composition which is to be applied to one surface using a hot-melt technique and another surface using a water-moistening technique, obviously considerations arise which are not present in the provision of an adhesive composition to be applied by either technique alone. For example, most water-moistenable adhesives do not possess the requisite thermoplastic properties permitting hot-melt application of desirably smooth glossy coats thereof. Similarly, most hot-melt applicable thermoplastic adhesives do not possess sufficient ability to be readily tackified by water-moistening (that is, they have inadequate wet tack). Nonetheless, in recent years various compositions apparently suitable for use as water-moistenable hot-melt applicable adhesive compositions have been described, such as those specified in U.S. Pat. No. 3,345,320 and No. 3,462,342. The earlier patent describes compositions of N-vinyl lactam copolymers in combination with plasticizer or "fluxing" agents and specifically mentions vinyl pyrrolidone-vinyl acetate copolymers in connection with a liquid polyethylene glycol plasticizer having an average molecular weight of 1,000. The latter patent describes a variety of synthetic organic resinous adhesives in combination with a hot-melt plasticizing material, and specifically mentions vinyl pyrrolidone/vinyl acetate copolymers in connection with a liquid polyethylene glycol ether hot-melt plasticizer having an approximate molecular weight of 600.

None of the compositions suggested to date have, however, proved to be entirely satisfactory in use. The major problems encountered with the available compositions arise out of their polychrestic nature requiring them to be both water-tackifiable and hot-melt applicable and are referred to in the trade as poor humidity block resistance and poor heat stability.

Such adhesive compositions must obviously be heat-tackifiable to be applied by hot-melt techniques and also moisture-tackifiable to be applied by water-moistening techniques. On the other hand, once the composition has been hot-melt applied to a substrate, it must be able to resist elevated temperature conditions likely to be found in its environment without again becoming tackifiable or undergoing other undesirable changes, such as discoloration (darkening), over a prolonged period of time. Similarly, it must be able to withstand the various humid conditions likely to be found in its environment without becoming tacky until it is actually moistened immediately prior to use. Consider, for example, the common phenomenon of postal envelopes with water-moistenable gumming on the flaps which become prematurely sealed on humid summer days. The same problem occurs on a larger scale within the adhesive manufacturing plant when an adhesively coated substrate carrying the hot-melt applied composition is formed into a layered roll or sheet-on-sheet storage configuration and the adhesive of one layer or sheet starts to adhere to the substrate of the layer or sheet underneath. The tendency of the adhesive to undergo premature sealing under humid conditions is measured in terms of the humidity blocking resistance at a given relative humidity (under a given load at a given temperature, for a given period of time). The blocking resistance is normally measured in terms of the percentage tear occurring, with high levels of blocking producing high levels of tear when the adhesive-bearing substrate is removed from the opposed surface. The aforementioned U.S. Pat. No. 3,345,320 indicates that some of its compositions exhibit the absence of blocking at 50% relative humidity, but the absence of blocking at such a low relative humidity is insufficient to guarantee a commercial product. For even marginal commercial acceptability, a product must be free of blocking at 75 percent relative humidity; and for general commercial acceptability a product must be block-free even at relative humidities as high as 80 or 83 percent. As hereinafter shown below in detail, adhesive compositions pursuant to the teachings of this patent fail to demonstrate an absence of blocking at the higher relative humidity levels. The aforementioned U.S. Pat. No. 3,462,342 characterizes its compositions only as possessing "antiblocking characteristics adequate for many applications" and provides no explicit data on the subject. As hereinafter shown below in detail, the vinyl pyrrolidone/vinyl acetate copolymer compositions recited by this patent are not free of blocking at the higher levels of relative humidity. In fact, many of the compositions taught by this patent exhibit such a low level of heat stability that they undergo thermal decomposition during hot melt application and thus cannot even betested for humidity block resistance.

Accordingly, it is an object of the present invention to provide a water-moistenable hot-melt adhesive composition characterized by a high degree of blocking resistance and an absence of blocking at commercially accepted levels of relative humidity.

It is another object to provide such a composition which combines a high degree of heat stability with a high level of blocking resistance.

SUMMARY OF THE INVENTION

It has now been found that the above and related objects of the present invention may be obtained in a water-moistenable hot-melt applicable adhesive composition characterized by the absence of blocking at 75 percent relative humidity under a 22°p.s.i. load at 22 °C for 24 hours. The composition consists essentially of a blend of at least one water-sensitive vinyl pyrrolidone/vinyl acetate copolymer, at least one water-soluble solid polyethylene glycol based wax having an average molecular weight of at least 4,000, and at least one water-insoluble wax. The water-soluble wax is generally selected from the group consisting of polyethylene glycol, the reaction product of polyethylene glycol and a diepoxide, and mixtures thereof. Preferably the water-soluble wax is a mixture of polyethylene glycol having an average molecular weight of at least 4,000 and a reaction product of polyethylene glycol and a diepoxide, the reaction product having an average molecular weight of at least 20,000. In such a preferred water-soluble wax mixture, the weight ratio of the polyethylene glycol and the reaction product is generally from about 1:1 to 2:1, and preferably about 1.5:1.

In a preferred blend, the copolymer has a weight ratio of its vinyl pyrrolidone moiety to its vinyl acetate moiety between about 10:90 and 70:30. The blend contains a total of 30–160 parts of wax comprising about 10–140 parts of the water-soluble wax (preferably about 40 parts) and about 20–80 parts of the water-insoluble wax (preferably about 40 parts) per 1000 parts by weight of the copolymer, the amount of water-soluble wax being at least 50 percent of the amount of water-insoluble wax. The water-insoluble wax is preferably a hydrogenated castor oil.

DETAILED DESCRIPTION OF THE PREFERRED EMBODIMENTS

The water-moistenable hot-melt applicable adhesive composition of the present invention is characterized by the absence of blocking at 75 percent relative humidity under a 0.4 p.s.i.g. load at 22°C for 24 hours. It consists essentially of a blend of at least one water-sensitive vinyl pyrrolidone/vinyl acetate copolymer, at least one water-soluble solid crystalline polyethylene glycol based wax having an average molecular weight of at least 4,000, and at least one water-insoluble solid wax.

The water-sensitive vinyl pyrrolidone/vinyl acetate copolymer is preferably N-vinyl-2-pyrrolidone/vinyl acetate copolymer. The weight ratio of the vinyl pyrrolidone monomer to the vinyl acetate monomer which is used in preparing these copolymers is optional depending on the desired properties; generally the copolymer has a weight ratio of its vinyl pyrrolidone moiety to its vinyl acetate moiety between about 10:90 and 70:30, and preferably 30:70. Within this range, the weight ratio may be varied to modify in particular the flow point temperature, blocking resistance and moistening sensitivity of the final composition. The average molecular weight of the copolymer generally ranges from about 50,000 to 150,000 and is obviously a function of the degree of polymerization.

The copolymerization is started using free radical initiators. It may be performed in solvent (e.g., isopropanol) or aqueous media with the additives (i.e., waxes, etc.) being added by mixing and the volatiles removed by heating (e.g., a slow temperature rise to 175°C); preferably, however, it is performed directly in the additive composition to eliminate the volatile removal problem. In any case polymerization is terminated when bromination tests indicate the absence of unreacted vinyl groups, and the final composition is then poured, cooled and subdivided into various forms for convenient handling as a solid.

The water-soluble solid polyethylene glycol based wax having an average molecular weight of at least 4,000 is preferably selected from the group consisting of polyethylene glycol, the reaction product of polyethylene glycol and a diepoxide and mixtures thereof. Generally about 10 to 140 parts of water-soluble solid wax are used in the blend per 1000 parts by weight of the copolymer, and preferably about 40 parts.

The polyethylene glycols useful in the present invention are linear polymers of ethylene oxide with the generalized formula $HOCH_2(CH_2OCH_2)_nCH_2OH$, where $n$ represents the average number of oxyethylene groups. (Technically speaking the polyethylene glycols are more correctly referred to as polyoxyethylene glycols, but they are commonly referred to simply as polyethylene glycols.) The polyethylene glycols having an average molecular weight of at least 4,000 are solid substances as opposed to lower weight polyethylene glycols which are liquid or pasty and which are not suitable for use as the water-soluble wax ingredient of the present invention (although such lower weight polyethylene glycols may be used as additives for the adhesive composition).

The reaction product of polyethylene glycol and a diepoxide useful in the present invention has an average molecular weight of at least 20,000 and is a solid. It is preferably non-hydroscopic and somewhat more flexible than the other solid polyethylene glycols. A suitable reaction product having an average molecular weight of 20,000, made by joining two molecules of polyethylene glycol having an average molecular weight of 6,000 with a diepoxide, is commercially sold by Union Carbide Corporation under the trademark CARBOWAX 20M.

In a preferred embodiment, the water-soluble wax is a mixture of polyethylene glycol having an average molecular weight of at least 4,000 and the reaction product of polyethylene glycol and diepoxide, the reaction product having an average molecular weight of at least 20,000. In such a preferred water-soluble wax mixture the weight ratio of the polyethylene glycol component to the reaction product component is generally from about 1:1 to 2:1, and preferably about 1.5:1. Use of higher proportions of the polyethylene glycol having an average molecular weight of about 4,000 tends to produce an adhesive composition exhibiting low levels of viscosity; use of higher proportions of the reaction product having an average molecular weight of at least 20,000 tends generally to produce an adhesive composition exhibiting a high level of viscosity; accordingly, the ratio should be adjusted to provide an optimal viscosity for the particular application. Mixtures within the recommended ratios generally provide adhesive compositions exhibiting an especially satisfactory level of blocking resistance, adhesion, remoistening tack and tearing speed, as well as a workable viscosity.

The water-insoluble solid wax is preferably a hydrogenated castor oil such as glyceryl tri hydroxy stearate. Such water-insoluble solid waxes are available from the Baker Castor Oil Company under the trademark designation of CASTOR-WAX. Other commercially available water-insoluble solid waxes useful in the present invention include N-stearyl 12-hydroxy stearamide; N-(2 hydroxy ethyl) - 12-hydroxystearamide; N,N'-ethyl bis 12-hydroxystearamide; N,N'-ethylene bis stearamide and such natural waxes as carnuauba and candelilla. Generally about 20 to 80 parts of the water-insoluble solid waxes are used in the blend per 1000 parts by weight of the copolymer, and preferably about 40 parts.

The blend preferably contains a total wax content (including both water-soluble and water-insoluble solid waxes) of about 30 to 160 parts per 1000 parts by weight of the copolymer. Higher proportions of total wax content result in blends having poor cohesion and adhesiveness, while lower proportions result in blends with poor block resistance. The amount of water-soluble solid wax present in the blend is preferably at least 50 percent of the amount of water-insoluble solid wax present. If the water-soluble to water-insoluble wax ratio is lower than 1:2, the blend exhibits poor moistenability.

A preferred adhesive composition is a blend consisting essentially of about 40 parts of the water-soluble wax and about 40 parts of the water-insoluble wax per 1000 parts by weight of the copolymer. Higher proportions of the water-soluble wax improve the moistenability (water-tackifiable property) of the composition, but also lower the blocking resistance of the composition. Higher proportions of the water-insoluble wax have the opposite effect, increasing the block resistance but decreasing the moistenability. In addition to the aforementioned essential ingredients of the composition, minor amounts of numerous other useful constituents generally used in conventional adhesive formulations may also be used, including antioxidants, scenting and flavoring agents, coloring agents, inert filler and extending materials, and the like.

The following represents a preferred formulation for the adhesive composition and provides good heat stability and commercially acceptable blocking resistance in combination with a suitable compromise combination of adhesion, viscosity, machinability, moistening speed, moistening tack and tear speed.

| PREFERRED FORMULATION | |
| --- | --- |
| Polyvinyl Pyrrolidone/Vinyl Acetate Copolymer | 1000 parts by wt. |
| CASTORWAX | 40 parts by wt. |
| CARBOWAX 4000 | 25 parts by wt. |
| CARBOWAX 20M | 16 parts by wt. |
| Antioxidant | 14 parts by wt. |
| Saccharin (for flavor) | 1.2 parts by wt. |

A conventional antioxidant, such as 2,6-di-tertiary-butyl paracresol may be used in the formulation.

It should be noted that the solid water-soluble (and, of course, the solid water-insoluble) waxes useful in the present invention are of sufficiently high molecular weight that they do not act as "plasticizers" or "fluxing" agents in the conventional sense of the term. While such solid waxes may under sufficient heat liquify and assit in fluidization of the copolymer by lowering its melt viscosity, upon cooling they regain their solid state. The solid waxes act as a latent antiblocking agent to improve the block resistance of the blend without detracting overly from its moistenability.

The efficacy of the compositions of the present invention is illustrated in Samples 1–5 of Example 1 and in Example 2 below, wherein all parts are by weight.

EXAMPLES

EXAMPLE 1

A variety of polyvinyl pyrrolidone/vinyl acetate copolymers having various monomer ratios were prepared and mixed with varying amounts of water-soluble and water-insoluble waxes and additive ingredients as indicated below in Table I. The properties of the samples thus formulated were tested (substantially according to conventional procedures described below) with the results indicated in Table I.

In the humidity blocking test for block resistance, the coating composition is hot melt applied to a white wove envelope stock substrate (½ inch × 1 inch), and a glass plate is used to press the gummed surface of the substrate down upon a blank sheet of paper supported by a temperature-and humidity-conditioned urethane foam. The test block is evaluated after 24 hours at the specified level of relative humidity (75 percent, 80 percent or 83 percent) and 22°C temperature, and the amounts of tab, pick and percent tear are recorded. "Non-block" or "OK" indicates completely free release of the gummed surface from the blank sheet. "Tab" indicates a superficial attraction usually accompanied by a zipping noise during release of the surfaces, and is not as serious as "pick". Pick indicates small, isolated, pin point areas of tear, usually totaling less than 5 percent of the total surface area. "Percentage tear" is used to indicate tears occurring over a larger percentage of the total surface area, usually over 5 percent.

Viscosity is measured in cps at 175°C (the average hot application temperature) using a Brookfield Thermosel.

The heat stability test measures melt stability with time under hot application conditions. An eight ounce wide-mouthed capped jar filled with 100 grams of hot melt is kept at 175°C in a non-circulatory oven for three days. Observations are made every 24 hours and any obvious change from initial condition of the melt is recorded; e.g., color changes, skinning (a skin formation on the surface of the melt) or viscosity changes.

Remoistening speed is measured using coated substrates of the type described in connection with the humidity blocking test hereinabove the coatings being moistened in a single stroke with a sponge wet with water and pressed down on a large sheet of similar white wove envelope stock. A small one quarter inch edge (bent back as a tab) is lifted slowly and the time in seconds recorded when tear first shows.

Remoistening percent tear is measured by a technique similar to that used in measuring remoistening speed, except that the moistened coating applied to the envelope stock is allowed to dry for 24 hours before lifting of the tab and a measurement is made of the percentage of the total coated surface torn.

The results indicate clearly that a commercially acceptable level of humidity blocking resistance is not achieved by PVP/VA copolymers in combination with the water-soluble waxes

TABLE I

| SAMPLES | 1 | 2 | 3 | 4 | 5 | 6[B] | 7[C] | 8[D] | 9[E] |
|---|---|---|---|---|---|---|---|---|---|
| PVP/VA monomer ratio | | | | | | | | | |
| 10/90 | | | | | | | | | 42 |
| 25/75 | | | | | | | | 30 | |
| 30/70 | 1000 | 1000 | 1000 | 1000 | 1000 | | | | |
| 40/60 | | | | | | 90 | | | |
| 45/55 | | | | | | | 77 | 60 | 42 |
| CW 600 | | | | | | 10 | | | |
| CW 1000 | | | | | | | | 10 | |
| CW 4000 | 25 | 25 | 25 | 25 | 41 | | | | |
| DOW E 6000 | | | | 16 | | | | | |
| DOW E 9000 | | | 16 | | | | | | |
| DOW E 20,000 | | 16 | | | | | | | |
| CW 20M | 16 | | | | | | | | |
| Triacetin | | | | | | | | 23 | |
| Glycerol | | | | | | | | | 16 |
| CASTORWAX | 40 | 40 | 40 | 40 | 40 | | | | |
| Antioxidants | 14 | 14 | 14 | 14 | 14 | 1 | 1 | | 1 |
| Saccharin | 1.2 | 1.2 | 1.2 | 1.2 | 1.2 | | | | |
| Humidity Blocking | | | | | | | | | |
| 75% RH | OK | OK | OK | OK | OK | 100% tear | 100% tear | 100% tear | 100% tear |
| 80% RH | OK | OK | OK | OK | OK | | | | |
| 83% RH | OK | OK | OK | OK | sl. Pick | | | | |
| Viscosity at 175°C,cps | 4650 | 4440 | 4000 | 3440 | 2750 | | | | |
| Remoistening Speed, sec. | 15 | 13 | 14 | 13 | 13 | | | | |
| Remoistening % Tear | 100 | 100 | 100 | 100 | 100 | | | | |
| Heat Stability at 175°C | | | | | | | | | |
| 1st day   Color | Light | Light | Sl. Darker | Light | Light | | | | |
| 1st day   Skin | No | No | No | No | No | | | | |
| 1st day   Viscosity | 4700 | 4500 | 4100 | 3500 | 2800 | | | | |
| 2nd day   Color | Light | Light | Sl. Darker | Light | Light | | | | |
| 2nd day   Skin | V. Slight | V. Slight | No. | No. | No. | | | | |
| 2nd day   Viscosity | 4800 | 4600 | 4250 | 3600 | 2950 | | | | |
| 3rd   Color | Light | Light | S.Darker | Light | Light | | | | |
| 3rd   Skin | Thin | Thin | V. Slight | V. Slight | No | | | | |
| 3rd   Viscosity | 5,000 | 4750 | 4300 | 3750 | 3000 | | | | |

LEGEND
LEGEND
[A]In Samples 1-5:
[B]Formulation 26 of U.S. 3,462,342
[C]Example 1 of U.S. 3,345,320
[D]Example 5 of U.S. 3,345,320
[E]Example 6 of U.S. 3,345,320 of low molecular weight or the triacetin or glycerol additives suggested by the prior art. On the other hand, the tripartite adhesive compositions consisting essentially of at least one PVP/VA copolymer, at least one water-soluble solid wax of high average molecular weight (at least 4000), and at least one water-insoluble solid wax were block free not only at the 75 percent RH level, but also at the 80 percent RH level, and in most cases the 83 percent RH level.

EXAMPLE 2

Generally speaking in this example the total wax content and the ratio of water-soluble to water-insoluble solid waxes in the preferred formulation are both varied over a wide range, and each of the resulting coating compositions are evaluated and found satisfactory. More specifically, based on 1000 parts by weight of the copolymer, the wax content of the preferred formulation is varied to provide compositions with wax contents as indicated by the X-marked blocks in Table II below, each of the resultant coating compositions being tested for humidity block resistance, remoistening speed and remoistening percent tear and found satisfactorily.

TABLE II

| WATER-INSOLUBLE WAX, parts | WATER-SOLUBLE WAX, parts | | | | | | | | |
|---|---|---|---|---|---|---|---|---|---|
| | 10 | 20 | 30 | 40 | 60 | 80 | 100 | 120 | 140 |
| 20 | X | X |   | X |   | X |   |   | X |
| 40 |   | X | X | X | X |   | X |   |   |
| 60 |   |   | X |   | X | X | X |   |   |
| 80 |   |   |   | X |   | X |   |   |   |

The preferred embodiments of the present invention now having been described in detail, various modifications and improvements thereon will become readily apparent to those skilled in the art. Accordingly, the spirit and scope of the present invention is to be considered as limited not by the foregoing disclosure, but only by the appended claims.

We claim:

1. A water-moistenable hot-melt applicable adhesive composition
   A. characterized by the absence of blocking at 75 percent relative humidity under a 0.4 p.s.i.g. load at 22°C for 24 hours; and
   B. consisting essentially of a blend of
      1. at least one water-sensitive vinyl pyrrolidone/vinyl acetate copolymer,
      2. at least one water-soluble solid polyethylene glycol based wax having an average molecular weight of at least 4,000, and
      3. at least one water-insoluble solid wax.

2. The composition of claim 1 wherein said water-soluble wax is selected from the group consisting of polyethylene glycol, the reaction product of polyethylene glycol and a diepoxide, and mixtures thereof.

3. The composition of claim 2 wherein said water-soluble wax is a mixture of polyethylene glycol having an average molecular weight of at least 4,000 and a reaction product of polyethylene glycol and a diepoxide, said reaction product having an average molecular weight of at least 20,000.

4. The composition of claim 3 wherein said mixture has a weight ratio of said polyethylene glycol and said reaction product of about 1:1 - 2:1.

5. The composition of claim 1 wherein said copolymer has a weight ratio of its vinyl pyrrolidone moiety to its vinyl acetate moiety between 10:90 and 70:30.

6. The composition of claim 1 wherein said blend contains a total of about 30–160 parts of said water-soluble and water-insoluble solid waxes per 1000 parts by weight of said copolymer, the amount of said water-soluble wax being at least 50 percent of the amount of said water-insoluble wax.

7. The composition of claim 1 wherein said blend contains about 10–140 parts of said water-soluble wax per 1000 parts by weight of said copolymer.

8. The composition of claim 1 wherein said blend contains about 20–80 parts of said water-insoluble wax per 1000 parts by weight of said copolymer.

9. The composition of claim 1 wherein said blend contains about 40 parts of said water-soluble wax and about 40 parts of said water-insoluble wax per 1000 parts by weight of said copolymer.

10. The composition of claim 1 wherein said water-insoluble wax is hydrogenated castor oil.

11. The composition of claim 1 characterized by the absence of blocking at 80 percent relative humidity.

* * * * *